(12) United States Patent
Budrow et al.

(10) Patent No.: US 6,941,665 B1
(45) Date of Patent: Sep. 13, 2005

(54) PIVOTABLE LASER LEVEL

(75) Inventors: William B. Budrow, Long Beach, CA (US); Stephen B. Munshi, Los Angeles, CA (US); Greg L. Holdridge, Stevenson Ranch, CA (US)

(73) Assignee: AWI Acquisition Company, Inc., Sylmar, CA (US)

( * ) Notice: Subject to any disclaimer, the term of this patent is extended or adjusted under 35 U.S.C. 154(b) by 0 days.

(21) Appl. No.: 10/803,627

(22) Filed: Mar. 17, 2004

(51) Int. Cl.[7] .............................................. G01C 15/02
(52) U.S. Cl. .................................... 33/286; 33/DIG. 21
(58) Field of Search ........................ 33/286, 227, 281, 33/282, 283, 285, DIG. 21

(56) References Cited

U.S. PATENT DOCUMENTS

| | | |
|---|---|---|
| 4,836,671 A | 6/1989 | Bautista |
| 5,208,438 A | 5/1993 | Underberg |
| 5,367,779 A * | 11/1994 | Lee ............................. 33/227 |
| 5,539,990 A | 7/1996 | Le |
| 5,594,993 A | 1/1997 | Tager et al. |
| 5,604,987 A | 2/1997 | Cupp |
| 5,713,135 A * | 2/1998 | Acopulos ..................... 33/286 |
| 5,754,582 A | 5/1998 | Dong |
| 6,005,719 A | 12/1999 | Rando |
| 6,163,969 A * | 12/2000 | Jan et al. ....................... 33/282 |
| 6,360,446 B1 * | 3/2002 | Bijawat et al. ............... 33/286 |
| 6,493,955 B1 | 12/2002 | Moretti |
| 6,502,319 B1 * | 1/2003 | Goodrich et al. ............. 33/286 |
| 6,539,638 B1 | 4/2003 | Pelletier |

* cited by examiner

Primary Examiner—Christopher W. Fulton
(74) Attorney, Agent, or Firm—Jack C. Munro

(57) ABSTRACT

A laser level that is mounted within a housing with the housing being pivotally movable relative to a base. The base is then to be placeable in conjunction with a hinge plate assembly composed of a main plate and an adjusting plate with the adjustable plate being also pivotally movable relative to the main plate. The result is the housing is pivotable in a clockwise direction within a first range of motion and then is pivotable in a counterclockwise direction within a second range of motion. The laser level of this invention is to project a laser beam onto a wall with the laser beam being in the form of a horizontal line or a vertical line and horizontal line. The vertical line is to be aligned with a particular mark on a wall. The horizontal line can be aligned with a wall/floor joint so that the horizontal line will be parallel to this joint when the horizontal line is moved away from the wall/floor joint and projected at a selected height on the wall.

21 Claims, 5 Drawing Sheets

PIVOTABLE LASER LEVEL

BACKGROUND OF THE INVENTION

1. Field of the Invention

The present invention relates generally to a leveling instrument and more particularly to a leveling instrument which uses a beam of light, specifically a laser beam, to project a single horizontal reference line, both a horizontal reference line and a vertical reference line or a reference dot.

2. Description of the Related Art

Laser levels have been used in the field of construction for many years. The typical procedure in conjunction with a laser level is to project either a precisely horizontal line or to project a line from one mark on a wall to another mark on a wall. The common form of laser level requires that the laser level unit be mounted directly on the wall surface on which the line is to be projected. This type of usage greatly limits the use of a laser level. For example, if a homeowner or tradesman desires to project a line spaced from a wall/floor joint but yet parallel to that joint, there was no way that this could be accomplished by use of the laser level alone. A distance measurement had to be made at two different spaced apart locations from the wall/floor joint with that distance measurement being the same and making appropriate marks on the wall. The laser level of the prior art then would be aligned up with those two marks with the line being projected therebetween. It would be more desirable to construct a device that would project that line not requiring the use of any particular marks or distance measurements on a wall.

Additionally, at times it may even be desirable to mount some structure on a ceiling with this structure being mounted along a line that is parallel to the wall/floor joint. With the prior art laser level this was an impossibility.

Also, laser levels of the prior art utilized a spirit level combination in conjunction with the laser level housing which would be used to precisely level the laser level housing so that the projected line would be precisely level. However, if one is installing cabinets, for example, it is desired that the lower level of the cabinets be precisely parallel to the wall/floor joint. The only way this could be accomplished would be by utilizing a pair of spaced apart distant measurements on the wall from different points along the floor, making the marks on the wall and then projecting a line between those two points. In most instances, if one were just to project a line which was deemed to be level by a spirit level then that line should be parallel to the wall/floor joint. However, in some cases, floors are not precisely parallel and may be located at a slight angle especially if the floor has been constructed to deal with water drainage. If one uses a level line to mount cabinets on a wall in such an instance then possibly the cabinets relative to the wall/floor joint would tend to be at a slight angle. If one could use a laser level that could project a beam which would comprise a reference line and then make that line parallel to the wall/floor joint and then move that line to the desired location on a wall, then the cabinets that would be placed on that wall would line up with the wall/floor joint.

SUMMARY OF THE INVENTION

The first basic embodiment of the present invention is directed to a pivotable laser level which utilizes a housing which has an end face with a laser beam to be projectable from this end face. The housing is pivotally attached to a base with the pivoting relative to the base occurring about a pivot axis, the base has an inner planar surface and an exterior planar surface. The base is movable from a first position where the inner surface abuts against the housing to a canted position where the inner surface is spaced from the housing.

A further embodiment of the present invention is where the just previous embodiment is modified by having the base including a magnet with the magnet to connect with the exterior planar surface of the base.

A further embodiment of the present invention is where the first basic embodiment is modified by the housing also including a spirit level assembly.

A further embodiment of the present invention is where the first basic embodiment is modified by the housing including a beam selector slide plate which is capable of emitting different configurations of the beam from the housing. The slide plate is slidably movable on the housing to be locatable in a beam projecting position from a plurality of different projecting positions where a different configuration of the beam is projected from each beam projecting position.

A further embodiment of the present invention is where the first basic embodiment is modified by the housing to be mountable on a hinge plate assembly which is composed of a main plate and an adjusting plate. The base which is connected to the housing is to be mounted on the adjusting plate. The adjusting plate is to be movable from an abutting position in juxtaposition with the main plate to an inclined position assuming an acute angular position relative to the main plate.

A further embodiment of the present invention is where the just previous embodiment is modified by having the adjusting plate being pivotally mounted about a second pivot axis relative to the main plate.

A further embodiment of the present invention is where the just previous embodiment is modified by the second pivot axis being located parallel to the first pivot axis.

A further embodiment of the present invention is where the just previous embodiment is modified by the housing being defined as having a back edge and a front end with the end face being located at the front end. The back edge is spaced the total length of the housing from the front end and the first pivot axis is located directly adjacent this back edge. The second pivot axis is defined as being located substantially in alignment with the front end.

A further embodiment of the present invention is where the hinge plate assembly is modified by having the main plate including a plurality of height adjusting screws and each of the screws is adjustable to vary the position of the hinge plate assembly on a supporting surface.

A further embodiment of the present invention is where the hinge plate assembly is modified by the adjusting plate including an enlarged recess. The base is to closely conform within the enlarged recess which precisely positions the base relative to the hinge plate assembly preventing lateral movement of the base relative to the hinge plate assembly.

A further embodiment of the present invention is where the just previous embodiment is modified by the base including a magnet with this magnet to be attached and held on the hinge plate assembly.

A second embodiment of the present invention is directed to a laser leveling system which utilizes a housing which includes a projectable laser beam with this laser beam to include a horizontal reference line. The housing is to be locatable in a spaced position from a vertical wall which connects between a horizontal floor and a ceiling (not shown), with the wall and the floor forming a wall/floor joint. The housing is to rest on a supporting surface which is spaced from the floor. The housing is attached to a structure which permits the laser beam to be projected to the wall/floor joint and then permits the housing to be moved to project the laser beam onto and across the vertical wall and the housing can be further moved to project the laser beam onto another location, the structure including a base which is pivotally mounted by a pivot joint on the housing, the housing being defined as having an end face from which the laser beam is projected. The pivot joint has a first pivot axis which is transverse to the laser beam, the housing being defined as having a back edge which is located opposite the end face and the first pivot axis is to be located directly adjacent the end face.

A further embodiment of the present invention is where the just previous embodiment is modified by the structure further including a hinge plate assembly which is composed of a main plate and an adjusting plate. The base is to be mounted by mounting means on the adjusting plate. The adjusting plate is to be movable from an abutting position in juxtaposition with the main plate to an inclined position assuming an acute angular position relative to the main plate.

A further embodiment of the present invention is where the just previous embodiment is modified by the adjusting plate being defined as being pivotally mounted about a second pivot axis.

A further embodiment of the present invention is where the just previous embodiment is modified by the second pivot axis being defined as being parallel to the first pivot axis.

A further embodiment of the present invention is where the just previous embodiment is modified by the second pivot axis being located in substantial alignment with the end face.

A further embodiment of the present invention is where a previously defined structure is modified by the base being defined as including a magnet with this magnet to be attached and held onto the hinge plate assembly.

A further embodiment of the present invention is where a prior defined structure is modified by the adjusting plate assembly being defined as including an enlarged recess with the base to closely conform within the enlarged recess in removable engagement in order to precisely position the base relative to the hinge plate assembly preventing lateral movement of the base relative to the hinge plate assembly.

A further embodiment of the present invention is where a prior defined structure is modified by the main plate of the hinge plate assembly defined as including a plurality of height adjusting screws. Each of the screws is adjustable to vary the position of the hinge plate assembly on a supporting surface.

A further embodiment of the present invention is where a prior defined structure is modified by the main plate as being defined as having a pair of alignment marks for the purpose of using the marks to denote the position of the hinge plate assembly on the supporting surface.

A fourth basic embodiment of the present invention is directed to a pivotable laser level which comprises a housing which has an end face and a laser beam is projectable from this end face. The pivotable laser level includes a base with the housing being mounted on the base. The housing is pivotable about a first pivot axis relative to the base in a clockwise direction. The base is to be mountable on a hinge plate assembly with the housing also being pivotable on the hinge plate assembly about a second pivot axis in a counterclockwise direction. Whereby the direction of the projection of the laser beam can be varied within at least ninety degrees.

A further embodiment of the present invention is where the just previous embodiment is modified by the direction of projection being defined as being approximately one-hundred and thirty-five degrees.

A fifth basic embodiment of the present invention is directed to a method of using a laser level comprising the steps of utilizing a housing from which is projectable a laser beam, pivotally connecting the housing on a base where the housing can be pivoted in a clockwise direction within a first range of motion, mounting the base on a hinge base assembly which includes an adjusting plate that is pivotable in a counterclockwise direction relative to a main plate within a second range of motion, mounting the housing, the base and the hinge plate assembly relative to a supporting surface on which it is spaced from a floor, projecting the laser beam onto a wall which connects to the floor at a wall/floor joint, moving the laser beam to align with the wall/floor joint, leveling the hinge plate assembly so the laser beam is in precise alignment with the wall/floor joint and then moving the laser beam to be projected only on the wall and spaced from the wall/floor joint to produce a horizontal line on the wall that is parallel to the wall/floor joint.

A further embodiment of the present invention is where the fifth basic embodiment is modified by the first range of motion is defined as being within ninety degrees and the second range of motion is defined as being within forty-five degrees.

A further embodiment of the present invention is where the fifth basic embodiment is modified by the first moving step including adjusting the position of the hinge plate assembly relative to the supporting surface.

A sixth basic embodiment of the present invention is directed to a laser leveling system which utilizes a housing structure that includes a projectable laser beam with the beam to be projected in a vertically oriented plane and also a horizontally oriented plane producing a vertical reference line on a wall and producing a horizontal reference line on a wall. The housing structure permits the laser beam to be moved on the wall so the horizontal reference line can be moved to assume various height positions on the wall. The housing is to rest on the supporting surface which is spaced from the vertical wall. The housing structure includes a spirit level assembly which is to be used to level the housing structure which will also produce a level horizontal reference line when the vertically oriented plane is perpendicular to the wall. The housing structure also includes means for marking the resting position of the housing structure on the supporting surface so if by chance the housing structure is accidentally moved from its resting position and then the reference line is no longer level, the user can replace the housing structure back to the resting position so the reference line will then be again level.

A further embodiment of the present invention is where the sixth basic embodiment is modified by the housing structure including a first pivot joint that permits the laser beam to be moved to illuminate above grade with grade being defined when the horizontally oriented plane of the beam is level.

A further embodiment of the present invention is where the just previous embodiment is modified by the housing structure including a second pivot joint that permits the laser beam to be moved to illuminate below grade.

A further embodiment of the present invention is where the sixth basic embodiment is modified by defining that the means for marking includes a pair of longitudinally aligned notches formed in the housing structure with these notches to be used to be connectable with a writing instrument to make a pair of marks on the supporting surface.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
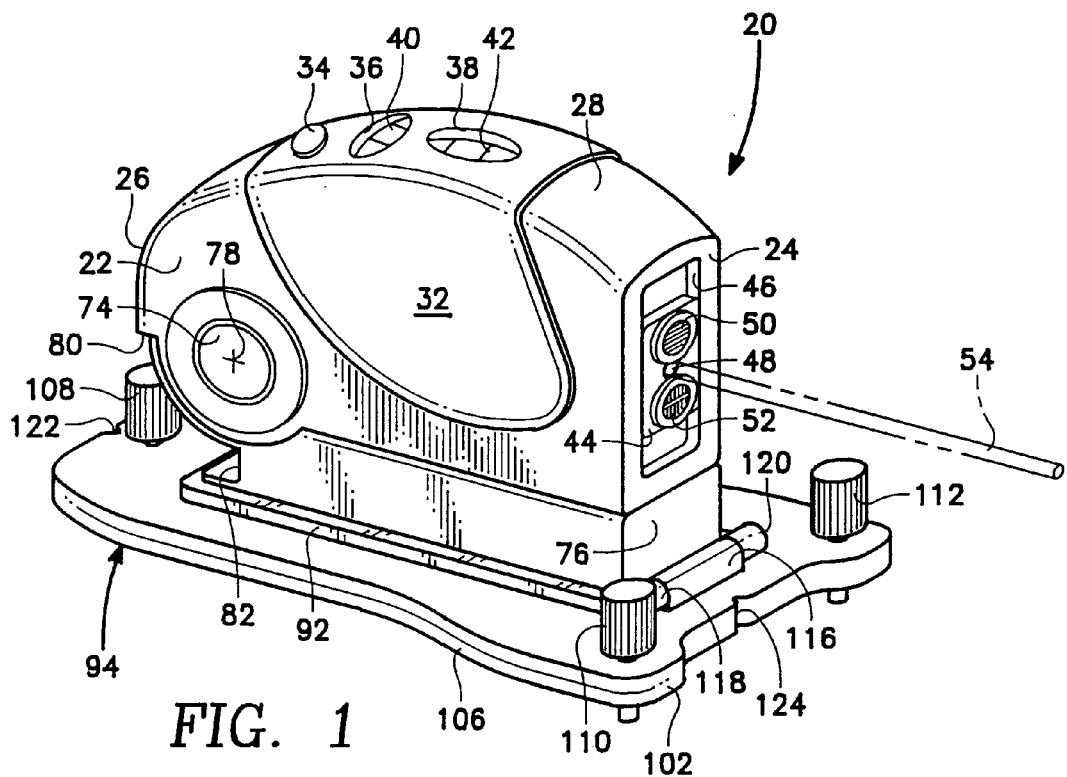
FIG. 1 is a frontal left side isometric view of the pivotable laser level of the present invention depicting projecting of a straight beam which will project as a dot on an exterior object.

Referring particularly to FIG. 1 of the drawings, there is shown the pivotable laser level 20 of this invention which has a housing 22. Housing 22 has a front end which is formed into an end face 24. The housing 22 has a rear edge 26. In between the end face 24 and the rear edge 26 is a top edge 28. Also located between the end face 24 and the rear edge 26 is a bottom edge 30. Generally, the housing 22 will be constructed of a metallic material, such as aluminum. However, it is considered to be within the scope of this invention that other rigid materials could be used, such as plastic.

Mounted in conjunction with the housing 22 is a hand grip 32. Generally, the hand grip will be constructed of a resilient type of material, such as rubber or plastic. The hand grip 32 extends down both sides of the housing 22 and is also located across the top edge 28. It is the function of the hand grip 32 to provide a comfortable gripping surface which is to be grabbed by a human user and in order to then effect movement of the housing 22. Included within the hand grip 32 is an on/off switch 34 and a pair of openings 36 and 38. Mounted within the housing 22 and connecting with the opening 36 is a first spirit level 40. Mounted also within the housing 22 and connecting with the opening 38 is a second spirit level 42. The spirit level 42 is located in a transverse position relative to the spirit level 40. The spirit level 40 is used to ascertain when the housing 22 is transversely level and the spirit level 42 is used to determine when the longitudinal position of the housing 22 is level. It is to be understood that both the spirit levels 40 and 42 constitute a glass vial within which is located a liquid and contained within that liquid is an air bubble. The construction of such spirit levels 40 and 42 is deemed to be conventional.

Figures 2, 3:
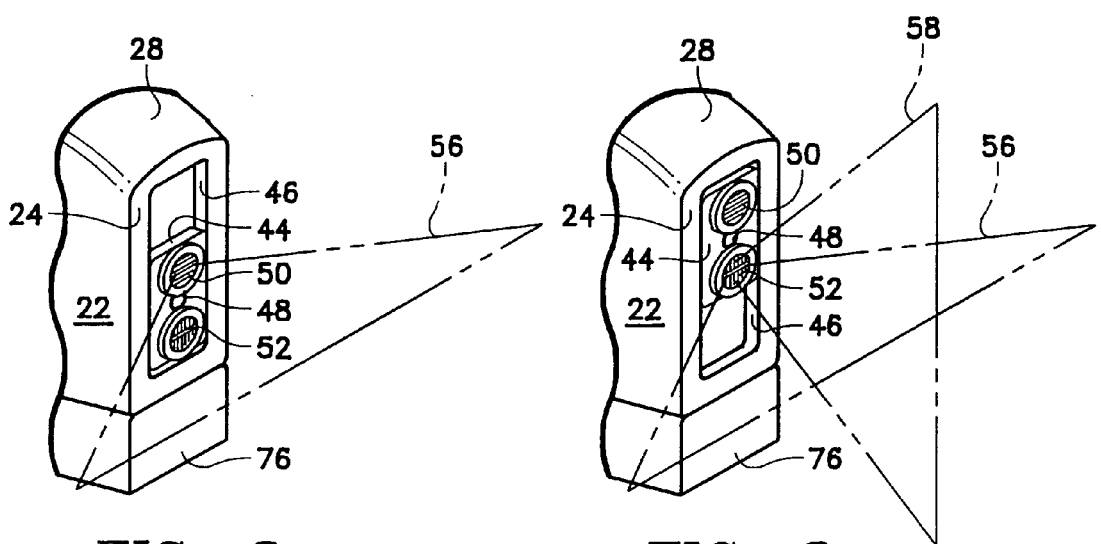
FIG. 2 is a frontal isometric view of a portion of the housing of the pivotable laser level of the present invention showing the slide plate that is mounted in conjunction with the end face of the housing in a position to project a fan shaped beam that will result in a horizontal line on an exterior object.
FIG. 3 is a view similar to FIG. 2 but showing the slide plate in a different position which will result in the projecting of two fan shaped beams located perpendicular to each other which will result in the producing of a crossed horizontal and vertical line on an exterior object.

Mounted within the end face 24 is a slide plate 44. The slide plate 44 is to be slidingly movable within a cavity 46 formed within the end face 24. This slide plate 44 can assume an uppermost position shown in FIG. 3, a lowermost position shown in FIG. 2 or an intermediate position located halfway in between the position of FIG. 3, which is shown in FIG. 1. The slide plate 42 includes a central opening 48 which is located between an upper lens 50 and a lower lens 52. Activating of the on/off switch 34 from an off position to an on position will cause a light beam to be generated. Included within the housing 22 is a light beam generator and a battery source. Construction of such a light beam generator and a battery source is deemed to be conventional and forms no specific part of this invention. The light that is commonly generated is what is referred to as a laser. With the slide plate 44 in the intermediate position, which is shown in FIG. 1, the light beam 54 that is emitted from the central opening 48 will end up producing a dot (not shown) on an exterior structure, such as a vertical wall. With the slide plate 44 in the lowermost position, which is shown in FIG. 2, the light that is generated passes through the upper lens 50 and produces in a plane a triangularly shaped or fan shaped beam 56. This will result in producing of a horizontal or transverse line on an exterior object, such as a vertical wall. With the slide plate 44 in an uppermost position, as shown in FIG. 3, the light that is generated is conducted through the lower lens 52 which will result in there not only being produced the beam 56 but also perpendicular to the beam 56 is another triangularly shaped beam 58 which is a plane which is perpendicular to the plane of beam 56. The result is the beams 56 and 58 will form crossed lines 60 and 62 on the exterior object, such as a vertical wall. These crossed lines 60 and 62 will be perpendicular to each other. It is common to refer such crossed lines as "cross hairs". The lines 60 and 62 and the dot can be used by a tradesman or homeowner to be a tool for alignment in a constructional project.

Figure 4:
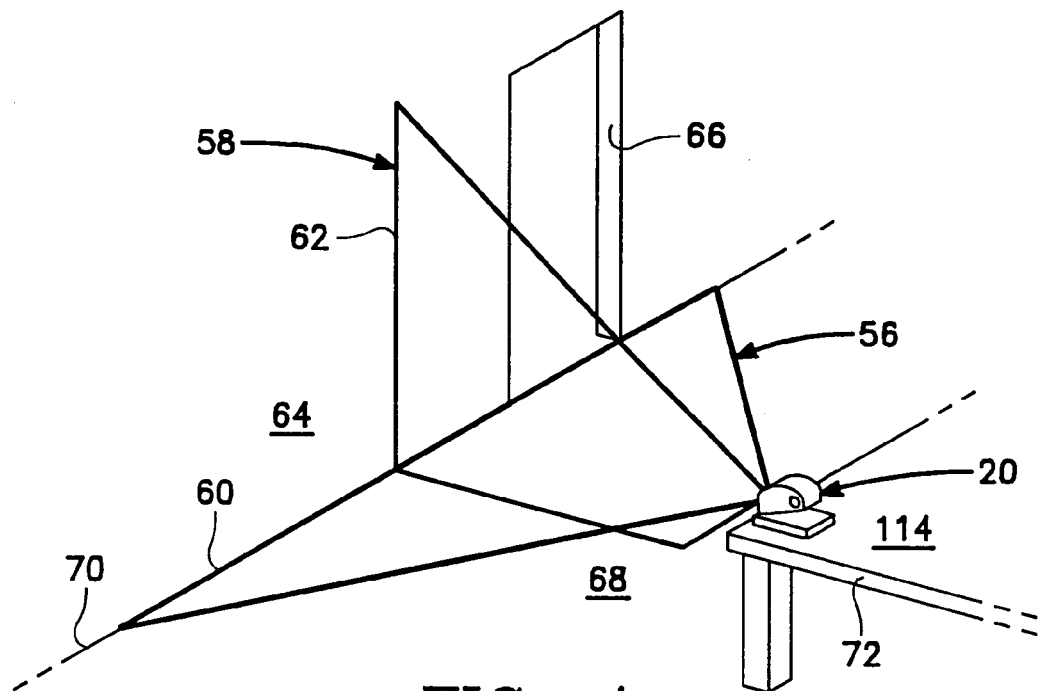
FIG. 4 is a schematic view depicting usage of the pivotable laser level of the present invention to achieve alignment of a projected horizontal reference line and a vertical reference line with the horizontal reference line being aligned with a wall/floor joint.
Figure 5:
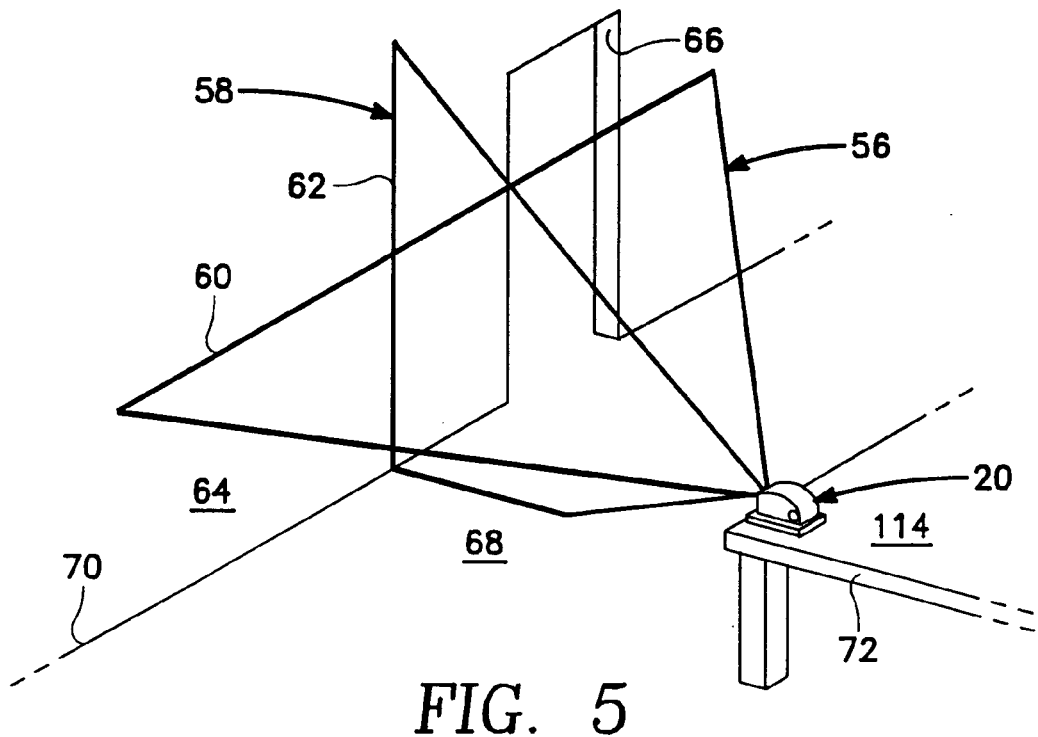
FIG. 5 is a view similar to FIG. 4 but where the horizontal reference line has been raised to be projected at a point on the wall which is spaced from the floor but it still remains parallel to the wall/floor joint.
Figure 6:
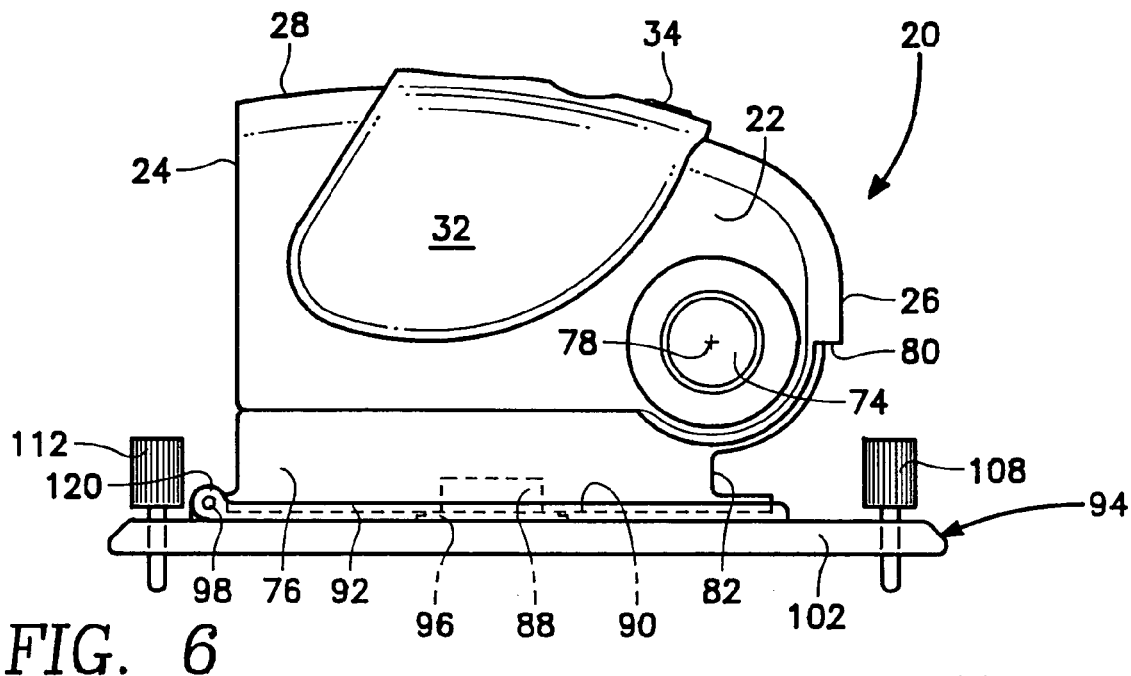
FIG. 6 is a right side elevational view of the pivotable laser level of the present invention.
Figure 7:
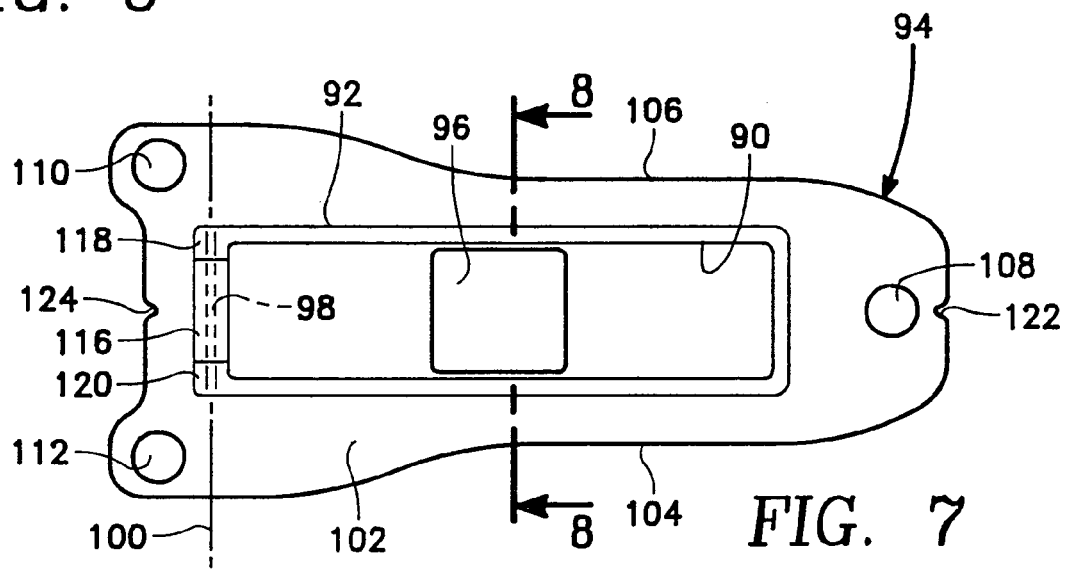
FIG. 7 is a top plan view of the hinge plate assembly that is utilized in conjunction with the pivotable laser level of the present invention.
Figure 8:
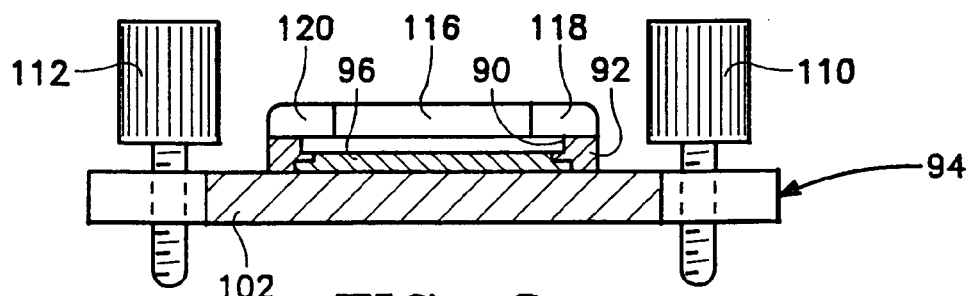
FIG. 8 is a transverse cross-sectional view taken along line 8—8 of FIG. 7.
Figure 9:
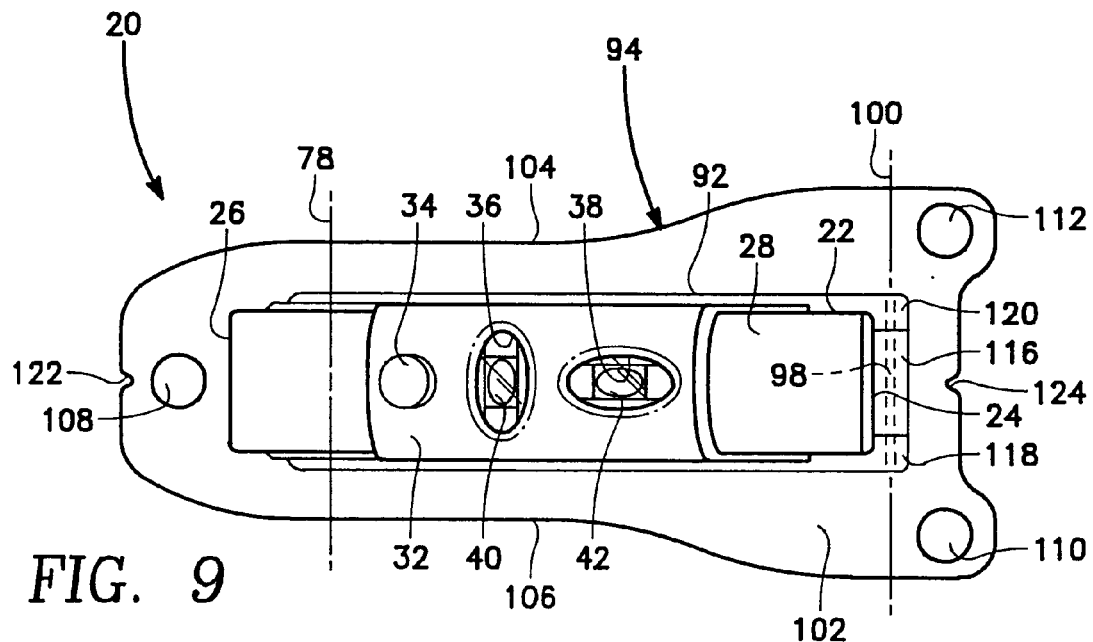
FIG. 9 is a top plan view of the pivotable laser level of the present invention.

Referring particularly to FIGS. 4 and 5, the vertical wall is shown as including a door opening 66. The vertical wall 64 will be located between a floor 68 and a ceiling, which is not shown. The ceiling will typically be parallel to the floor 68, although that is not necessary. Where the wall 64 joins with the floor 68 there is formed a wall/floor joint 70 which comprises a straight line. Normally, the wall/floor joint 70 should be level. However, within some buildings and houses, it is possible that the wall/floor joint 70 will not be level but will have a slight angle to it. The user could use the wall/ceiling joint instead or any other horizontal line such as a counter/wall joint. Also, a horizontal line could be drawn on the wall and that line could be used. If two spaced apart parallel horizontal lines are used, and the reference line 60 is arranged to align with one of these parallel lines and then arranged to align with the other of these parallel lines, the user will then know that the beams 56 and 58 are perpendicular to the wall 64. Being perpendicular is important when the reference line 60 is then moved so line 60 will always be parallel to these parallel lines.

The pivotable laser level 20 is shown in FIGS. 4 and 5 being mounted on a table 72. It is to be noted that the pivotable laser level 20 is mounted directly adjacent an edge of the table 72. The mounting of the pivotable laser level 20 on the table 22 will be such that the end face 24 will be located parallel to the vertical wall 64 which is also where the projected beam(s) are located perpendicular to the wall. Let it be assumed that the operator has desired to use the slide plate 44 in the position shown in FIG. 3 producing both beams 56 and 58. As a result, there is also produced the horizontal reference line 60 and the vertical reference line 62.

Figure 11:
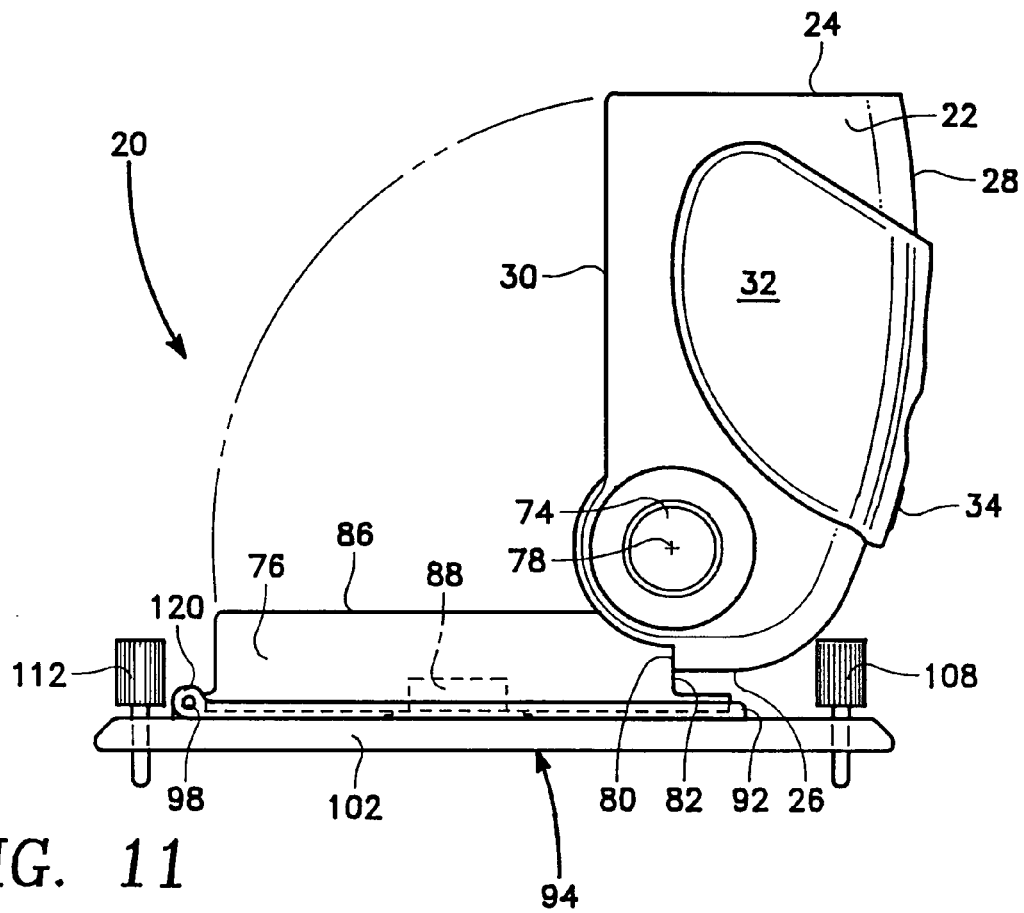
FIG. 11 is a view similar to FIG. 10 but with the hinge plate assembly in a non-pivoted position but where the housing is pivoted to an approximate ninety degree position relative to the base on which it is mounted.
Figure 12:
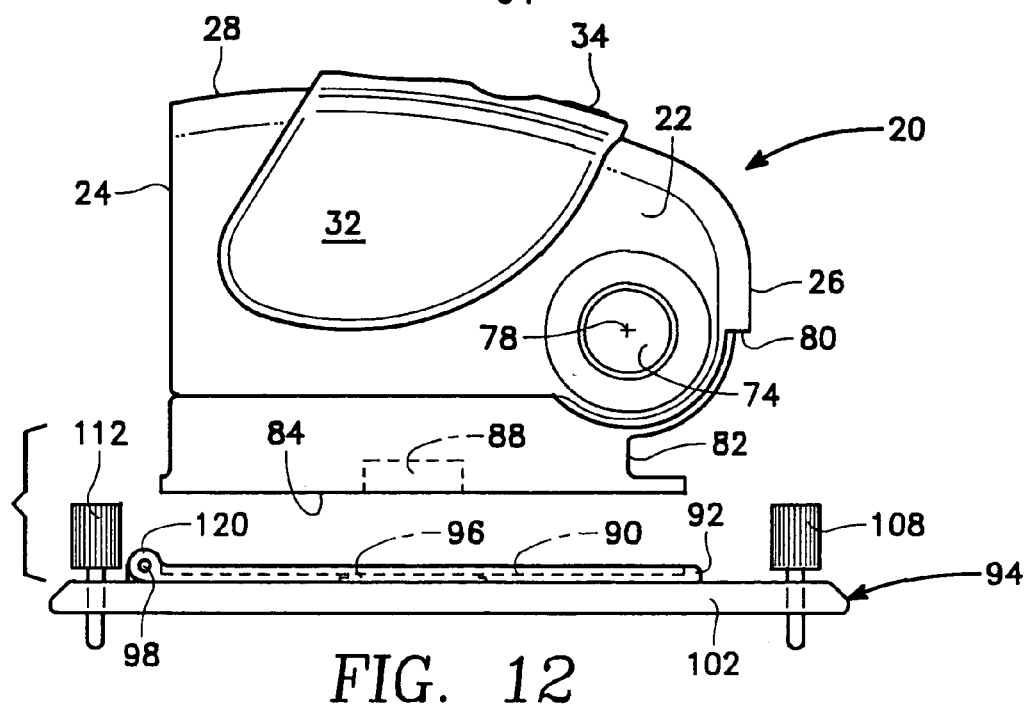
FIG. 12 is a right side elevational view of the pivotable laser level of thee present invention showing the housing and its attached base being separated from the hinge plate assembly.

The housing 22 is mounted by a pivot pin 74 to a base 76. The housing 22 is pivotable about a first pivot axis 78 which is produced by the pivot pin 74. The construction of the base 76 is basically similar in size to the transverse cross-sectional area of the housing 22. The pivot pin 74 may include a set screw, which is not shown, that will function to tighten the connection between the base 76 and the housing 22. This tightening is to be such that pivoting of the housing 22 relative to the base 76 will be permitted, but once the desired pivoting position has been obtained and the housing 22 is released, that position will be maintained until it is then physically moved to another position. The construction between the housing 22 and the base 76 is such that the housing 22 can be pivoted approximately ninety degrees relative to the base 76. This ninety degree position is shown in FIG. 11. Greater than ninety degrees is not necessary as it is only necessary to turn housing 22 around one hundred eighty degrees to obtain an additional ninety degree arc. The shoulder 80 of the housing 22 functions as a stop to limit this amount of movement with the shoulder 80 abutting against notch 82 of the base 76. It is considered to be within the scope of this invention that any desired angle of movement could be obtained between the housing 22 and the base 76. It has just been discovered that generally a ninety-degree range of motion is satisfactory and by turning the housing 22 around, the user has available a total of one hundred eighty degrees.

The base 76 includes an exterior surface 84 and an interior surface 86. The housing 22 is to be movable from a position in juxtaposition with the base 76, where the bottom edge will abut against the inner surface 86, to a pivoted position with the maximum pivoting position being shown in FIG. 11 where bottom edge 30 is spaced some distance from the inner surface 86. Formed within the base 76 is a magnet 88. This magnet 88 connects with the exterior surface 84. The exterior surface 84 has a generally rectangular shape which is capable of resting within rectangular shaped cutout 90 formed within an adjusting plate 92 of a hinge plate assembly 94. It is desired to not permit relative movement between base 76 and adjusting plate 92 which would misalign the housing 22 and move the projected beam from its desired location. Mounted within the adjusting plate 92 is a metal pad 96. Normally, the hinge plate assembly 94 might be constructed of a non-metallic material, such as a plastic, except for the metal pad 96. As previously mentioned, the exterior surface 84 will closely fit within the cutout 90 with there not being permitted any longitudinal or transverse movement between the base 76 and the adjusting plate 92. In order to insure that the housing 22 will remain in its position in conjunction with the adjusting plate 92, the magnet 88 will exert a magnetic force of attraction in conjunction with the metal pad 96. The amount of force therebetween can be overcome by merely physically grabbing onto the housing 22 and causing such to be lifted from the adjusting plate 92.

The adjusting plate 92 is pivotally connected by hinge pin 98 about a second pivot axis 100. The hinge pin 98 passes through center member 116 which is fixed onto main plate 102. The pivoting action between the adjusting plate 92 and the main plate 102 will occur between the center member 116 and the ears 118 and 120 which are mounted on the adjusting plate 92. Included in conjunction with the hinge pin 98, center member 116 and ears 118 and 120 will be a set screw (not shown) that can be tightened or loosened so when the desired pivot position is obtained, the adjusting plate 92 will remain in the adjusted position. The hinge pin 98 is fixed to center member 116. The main plate 102 is substantially larger than the adjusting plate 92. The area on the main plate 102 that surrounds the adjusting plate 92 constitutes a ledge that facilitates the location of a user's thumb and fingers. Also, the side edges of the main plate 102 are curved forming concavities 104 and 106. These concavities 104 and 106 function to ergonomically make it easier for a user to grasp onto the hinge plate assembly 94.

Mounted within the main plate 102 are three in number of adjusting screws 108, 110 and 112. Each of the adjusting screws 108, 110 and 112 is threadingly mounted within the main plate 102. The outer end of each of the adjusting screws 108, 110 and 112 protrudes below the lower surface of the main plate 102. It is these outer ends of the adjusting screws 108, 110 and 112 that is to be located in direct contact with the supporting surface 114 which will be the top of the table 72. It is to be understood that any type of surface could be utilized in which to mount the pivotable laser level of this invention, not necessarily a table. The adjusting screws 108, 110 and 112 are to be threaded in and out varying the amount of inclination of the main plate 102 until a level position is obtained as indicated by reading of the spirit levels 40 and 42.

Figure 10:
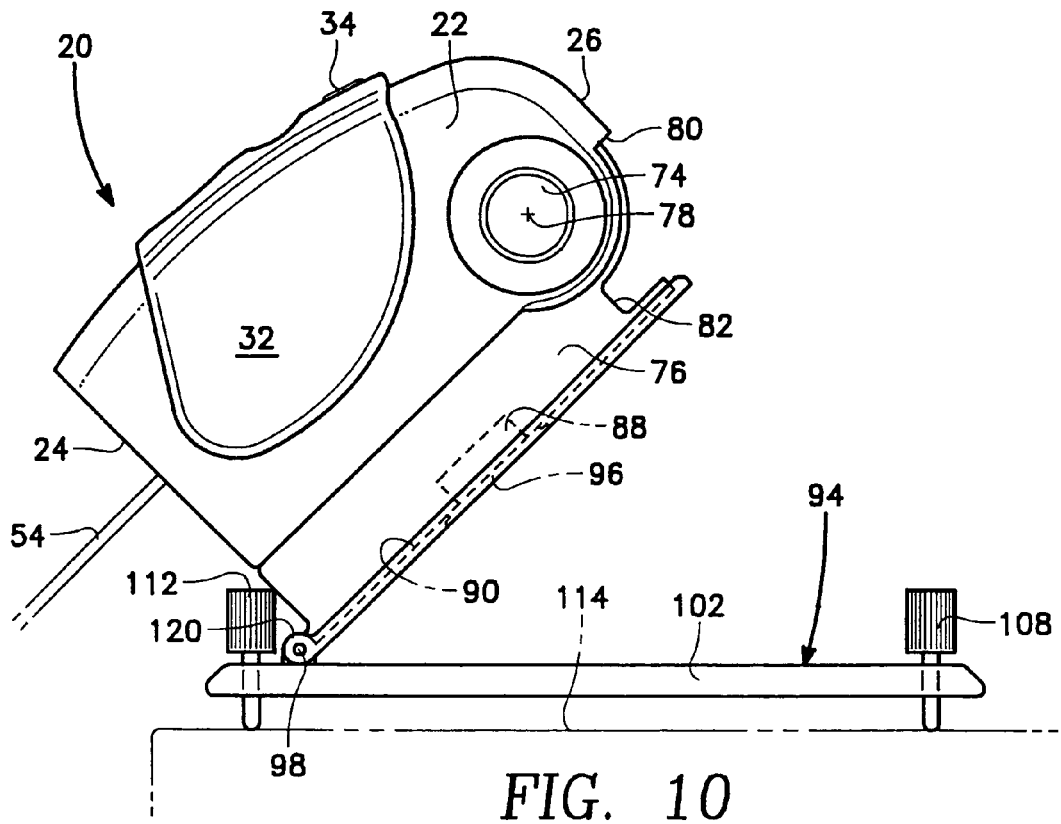
FIG. 10 is a right side elevational view showing the hinge plate assembly in a pivoted position relative to the supporting surface on which it is mounted.

Within the rear end of the main plate 102 is located a notch 122. Formed within the front end of the main plate 102 is located a notch 124. These notches 122 and 124 are in longitudinal alignment. The purposes of the notches 122 and 124 is so that when the base 76 is mounted in conjunction with the adjusting plate 92 and the outer ends of the adjusting screws 108, 110 and 112 are in contact with the supporting surface 114 that the user is to turn on the light generator by pushing on on/off switch 34 and with the slide plate 44 in the position shown in FIG. 3 is to manually adjust the position of the housing 22 until the end face 24 is located parallel to the vertical wall 64. In this particular position, the user is to then place a mark with a pencil, pen or other similar writing instrument, on the supporting surface 114 by using notches 122 and 124 as a guide. Typically, the user will then pivot the housing 22 to a canted position relative to the main plate 102 which will pivot the adjusting plate 92 on the hinge pin 98 about the second pivot axis 100. This canted position is shown in FIGS. 4 and 10 of the drawings. The beam 54 that is emitted produces the horizontal reference line 60 and it is the intent for the user to precisely align the horizontal reference line 60 with the wall/floor joint 70. In order to accomplish this, the housing 22 and hinge plate assembly 94 is pivoted on the supporting surface 114 until the horizontal reference line 60 precisely aligns with the wall/floor joint.

The user then proceeds to move the adjusting plate 76 and housing 22 in a clockwise direction until the adjusting plate 76 will be located abutting the main plate 102. At this particular time, it is noted that the reference line 60 is now moved off of the wall/floor joint 70 and is located at a height on the wall, called grade where the horizontal projected beam 56 is level, that is approximately equal to the height of the table 72 off the floor 68. Let it be assumed that the user wants to have the reference line 60 to be located at a prescribed height on the wall 64 which is above the height of the table 72 and this line parallel to wall/floor joint 70. The user will have made a mark on the wall, which is not shown, again with a pen or a pencil, and normally the vertical reference line 62 will be aligned with that mark by turning of the housing 22 prior to the placing of the marks in conjunction with the notches 122 and 124. In order to align the horizontal reference line 60 in conjunction with the mark located on the wall 64, the housing 22 is pivoted about the first pivot axis 78 which will cause the housing 22 to assume a spaced position relative to the base 76. When the desired placement of the horizontal reference line 60 has been achieved, the user typically releases the housing 22 which will then remain in that established position.

It is to be understood that the housing 22 and base 76 may be utilized without the hinge plate assembly 94. For example, the base 76 could be mounted on a metallic member, such as a pipe.

The horizontal reference line 60 when located on the desired location on the wall 64 can be used for the purpose of aligning pictures when hanging such, aligning cabinets when installing such, for installing tile, bookshelves, etc.

It is also considered to be within the scope of this invention that the base 76 will probably include a threaded hole that connects with the exterior surface 84. That threaded hole could be used to mount the housing 22 and the base 76 on a tripod, which is not shown. A tripod could be used instead of the table 72 or other supporting surface.

It is noted that the range of motion of the hinge plate 76 relative to the main plate 102 is generally about forty-five degrees. However, this range of motion could be increased or decreased without departing from the scope of this invention. In the same vane, the range of motion of the housing 22 relative to the base 76 is ninety degrees. However, again this range of motion could be increased or decreased without departing from the scope of this invention.

It is to be noted that the second pivot axis 100 permits the beam 54 to be projected below grade. The first pivot axis 78 permits the beam 54 to be projected above grade.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be added for the device described, but also a method claim is added to address the method of making the invention. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A pivotable laser level comprising:
   a housing having an end face, a laser beam being projectable from said end face;
   a base, said housing being mounted on said base, said housing being pivotable about a first pivot axis relative to said base, said base having an inner planar surface and an exterior planar surface, said base being movable from a first position where said inner planar surface abuts against said housing to a canted position where said inner planar surface is spaced from said housing; and
   a hinge plate assembly composed of a main plate and an adjusting plate, said base being mountable on said adjusting plate, said adjusting plate being movable from an abutting position in juxtaposition with said main plate to an inclined position assuming an acute angular position relative to said main plate.

2. The pivotable laser level as defined in claim 1 wherein: said adjusting plate being pivotally mounted about a second pivot axis relative to said main plate.

3. The pivotable laser level as defined in claim 2 wherein: said second pivot axis being parallel to said first pivot axis.

4. The pivotable laser level as defined in claim 3 wherein: said housing having a back edge and a front end, said end face located at said front end, said back edge being spaced the total length of said housing from said front end, said first pivot axis being located directly adjacent said back edge, said second pivot axis being located substantially in alignment with said front end.

5. The pivotable laser level as defined in claim 1 wherein: said main plate including a plurality of height adjusting screws, each of said height adjusting screws being adjustable to vary the position of said hinge plate assembly on a supporting surface.

6. The pivotable laser level as defined in claim 1 wherein: said adjusting plate including an enlarged recess, said base to closely conform within said enlarged recess which precisely positions said base relative to said hinge plate assembly preventing lateral movement of said base relative to said hinge plate assembly.

7. The pivotable laser level as defined in claim 6 wherein:

said baseplate includes a magnet, said magnet to be attached to and held onto said hinge plate assembly.

8. A laser leveling system comprising:

a housing which includes a projectable laser beam, said laser beam including a horizontal line;

said housing to be located in a spaced position from a vertical wall which connects with a horizontal floor with said wall and said floor forming a wall/floor joint, said housing to rest on a supporting surface which is spaced from said floor;

said housing being attached to a structure which permits said laser beam to be projected to said wall/floor joint and then permits said housing to be moved to project said laser beam onto and across said vertical wall and said housing can be further moved to project said laser beam to another location, said structure includes a base which is pivotally mounted by a pivot joint on said housing, said housing has an end face from which said laser beam is projected, said structure further includes said pivot joint having a first pivot axis which is transverse to said laser beam, said housing having a back edge which is located opposite said end face, said first pivot axis being located directly adjacent said back edge; and said structure further includes a hinge plate assembly composed of a main plate and an adjusting plate, said base being mounted by mounting means on said adjusting plate, said adjusting plate being movable from an abutting position in juxtaposition with said main plate and an inclined position assuming an acute angular position relative to said main plate.

9. The laser leveling system as defined in claim 8 wherein:

said structure further including said adjusting plate being pivotally mounted about a second pivot axis.

10. The laser leveling system as defined in claim 9 wherein:

said second pivot axis being parallel to said first pivot axis.

11. The laser leveling system as defined in claim 10 wherein:

said second pivot axis being located substantially in alignment with said end face.

12. The laser leveling system as defined in claim 8 wherein:

said mounting means comprising a magnet, said magnet to be attracted to and held onto said adjusting plate.

13. The laser leveling system as defined in claim 8 wherein:

said structure including said adjusting plate having an enlarged recess, said base to closely conform within said enlarged recess in a removable engagement manner which precisely positions said base relative to said hinge plate assembly preventing lateral movement of said base relative to said hinge plate assembly.

14. The laser leveling system as defined in claim 8 wherein:

said structure further including said main plate having a plurality of height adjusting screws, each of said screws being adjustable to vary the spacing of said hinge plate assembly on a supporting surface.

15. The laser leveling system as defined in claim 8 wherein:

said main plate having a pair of alignment marks, said alignment marks to be utilized in conjunction with separate marks located on the supporting surface in order to make known to the user the precise position of location for said laser leveling system.

16. A pivotable laser level comprising:

a housing having an end face, a laser beam being projectable from said end face;

a base, said housing being mounted on said base, said housing being pivotable about a first pivot axis relative to said base in a clockwise direction; and said base to be mountable on a hinge plate assembly, said housing also being pivotable on said hinge plate assembly about a second pivot axis in a counterclockwise direction, whereby the direction of propagation of said laser beam can be varied at least ninety degrees.

17. The pivotable laser level as defined in claim 16 wherein:

said direction of projection can be varied approximately one-hundred and thirty-five degrees.

18. A method of using a laser level comprising the steps of:

utilizing a housing from which is projected a laser beam;

pivotally connecting said housing on a base where said housing can be pivoted in a clockwise direction within a first range of motion;

mounting said base on a hinge plate assembly which includes an adjusting plate that is pivotable in a counterclockwise direction relative to a main plate within a second range of motion;

mounting said housing, base and hinge plate assembly on a supporting surface which is spaced from a floor;

projecting said laser beam onto a wall which connects to the floor at a wall/floor joint;

moving said laser beam to align with said wall/floor joint and where said laser beam is projected to the wall; and moving said laser beam to be projected only on the wall and spaced from the wall/floor joint to produce a horizontal line on the wall that is parallel to the wall/floor joint.

19. The method as defined in claim 18 wherein the first range of motion is within ninety degrees and the second range of motion is within forty-five degrees.

20. The method as defined in claim 18 wherein the first moving step includes adjusting the position of the hinge plate assembly relative to the supporting surface.

21. A laser leveling system comprising:

a housing structure which includes a projectable laser beam with said beam to be projected in a vertically oriented plane and a horizontally oriented plane producing a vertical reference line on a wall and also producing a horizontal reference line on a wall, said housing structure permits said laser beam to be moved on the wall so said horizontal reference line can be moved to assume various height positions on the wall, said housing to rest on a supporting surface which is spaced from said vertical wall;

said housing structure includes a spirit level assembly which is to be used to level said housing structure which will also produce a level said horizontal reference line when said vertically oriented plane is perpendicular to the wall, said housing structure also including means for marking the resting position of said housing structure on the supporting surface so if by chance said housing is accidentally moved from its resting position, and then said reference line is no longer level, the user can replace said housing structure back to said resting position so said reference line will then be again level;

said housing structure includes a first pivot joint that permits said laser beam to be moved to illuminate above grade with grade being defined when said horizontally oriented plane is level; and said housing structure includes a second pivot joint that permits said laser beam to be moved to illuminate below said grade.

* * * * *